United States Patent
Bell et al.

(10) Patent No.: US 8,613,106 B2
(45) Date of Patent: Dec. 17, 2013

(54) REDUCING THE VALUE OF A BROWSER FINGERPRINT

(75) Inventors: Denise Ann Bell, Austin, TX (US); Travis M. Grigsby, Austin, TX (US); Jana Helton Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 12/845,327

(22) Filed: Jul. 28, 2010

(65) Prior Publication Data

US 2012/0030576 A1    Feb. 2, 2012

(51) Int. Cl.
G06F 21/00    (2013.01)

(52) U.S. Cl.
USPC .................................. 726/28; 726/25; 726/26

(58) Field of Classification Search
USPC .............................................. 726/25, 26, 28
See application file for complete search history.

(56) References Cited

U.S. PATENT DOCUMENTS

| 7,386,877 | B2* | 6/2008 | Winiger et al. ................... 726/3 |
| 2003/0074326 | A1 | 4/2003 | Byers |
| 2005/0273866 | A1 | 12/2005 | Brown et al. |
| 2006/0200555 | A1 | 9/2006 | Shannon et al. |
| 2006/0212704 | A1 | 9/2006 | Kirovski et al. |
| 2009/0028395 | A1 | 1/2009 | Riionheimo |
| 2009/0293102 | A1* | 11/2009 | Klein et al. ........................ 726/2 |
| 2010/0071066 | A1* | 3/2010 | Kline et al. ..................... 726/25 |

* cited by examiner

*Primary Examiner* — Jeffrey Pwu
*Assistant Examiner* — William Corum, Jr.
(74) *Attorney, Agent, or Firm* — Moore & Van Allen PLLC

(57) ABSTRACT

A method, operable on a processing device, for reducing the value of a browser fingerprint may include receiving, by the processing device, a request to provide a list of plugins installed on a browser. The method may also include generating, by the processing device, a fake list of plugins installed on the browser. The method may additionally include communicating, by the processing device, the fake list of plugins installed on the browser in response to the received request to provide a list of plugins installed on the browser.

21 Claims, 4 Drawing Sheets

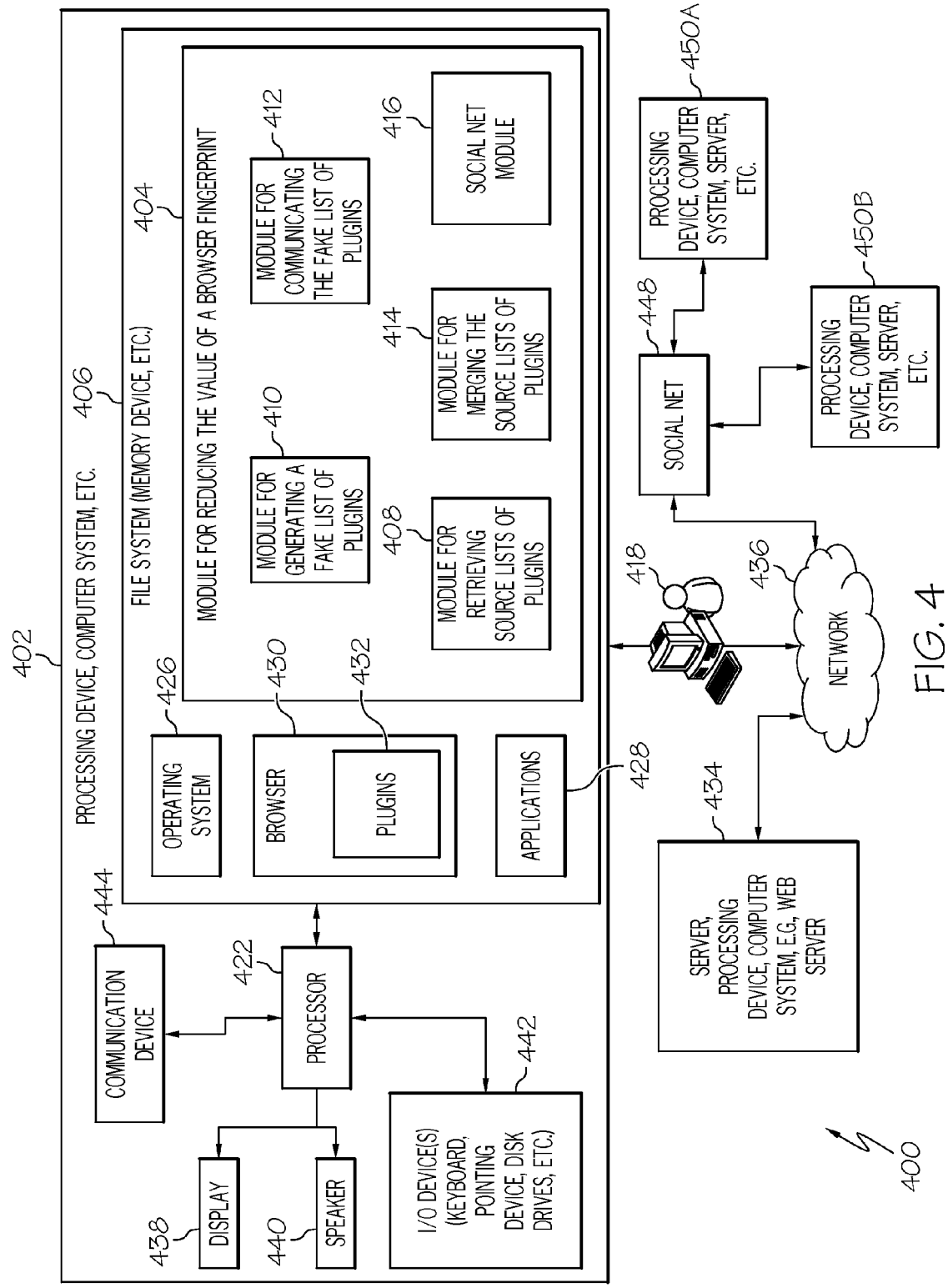

REDUCING THE VALUE OF A BROWSER FINGERPRINT

BACKGROUND

Aspects of the present invention relate to protecting privacy of a browser user, and more particularly to a method, system and computer program product for reducing the value of a browser fingerprint.

In current times, use of the Internet for web browsing continues to find new users and gain in popularity among historic users in part because of expanding Internet resources and tools such as, for example, widespread availability of online marketplaces, ever-increasing breadth of blogging topics as well as the number and quality of blogs, among others. Unfortunately, as Internet users continue to increase their use of the Internet for traditionally non-electronic endeavors such as shopping, seeking out current events information and the like, users will also continue to encounter ever more sophisticated schemes for invading their privacy.

When an Internet user directs his or her browser to a website, the browser interacts with a web server hosting the website. The browser typically has many installed add-on applications, referred to as plugins, for performing various supplemental, and in some cases essential, functions during the web browsing experience. In order to gain insight into the capabilities of a browser, a web server can request a list of plugins installed on the browser. Then, the web server might, in some instances, modify the content it provides to the browser based on the return list of plugins. The plugins installed on the browser, and in some cases other data or characteristics of the browser, when compiled in a list can represent a fingerprint of the browser. In many, in fact most, cases the browser fingerprint is unique to the browser. Accordingly, the fingerprint, that is, the list of plugins tends to identify the specific browser, thereby inherently posing a privacy threat. A method for reducing the value of the browser fingerprint by adding real and/or fake plugins, each being installed or uninstalled on the browser, to the list of plugins returned by the browser in response to a request for the list is needed.

BRIEF SUMMARY

According to one aspect of the present invention, a method, operable on a processing device, for reducing the value of a browser fingerprint may include receiving, by the processing device, a request to provide a list of plugins installed on a browser. The method may also include generating, by the processing device, a fake list of plugins installed on the browser. The method may additionally include communicating, by the processing device, the fake list of plugins installed on the browser in response to the received request to provide a list of plugins installed on the browser.

According to another aspect of the present invention, a processing device for reducing the value of a browser fingerprint may include a processor. The processor may be configured to receive a request to provide a list of plugins installed on a browser. The processor may also include a module operable on the processor for reducing the value of the browser fingerprint. The module may include a module for generating a fake list of plugins installed on the browser. The module may also include a module for communicating the fake list of plugins installed on the browser in response to the received request to provide a list of plugins installed on the browser.

According to another aspect of the present invention, a computer program product for reducing the value of a browser fingerprint may include a computer readable storage medium having computer readable program code embodied therewith. The computer readable program code may include computer readable program code configured to receive a request to provide a list of plugins installed on a browser. The computer readable program code may also include computer readable program code configured to generate a fake list of plugins installed on the browser. The computer readable program code may further include computer readable program code configured to communicate the fake list of plugins installed on the browser in response to the received request to provide a list of plugins installed on the browser.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 4 is a block schematic diagram of an example of a system 400 for reducing the value of a browser fingerprint in accordance with an embodiment of the present invention.

DETAILED DESCRIPTION

Figure 1:
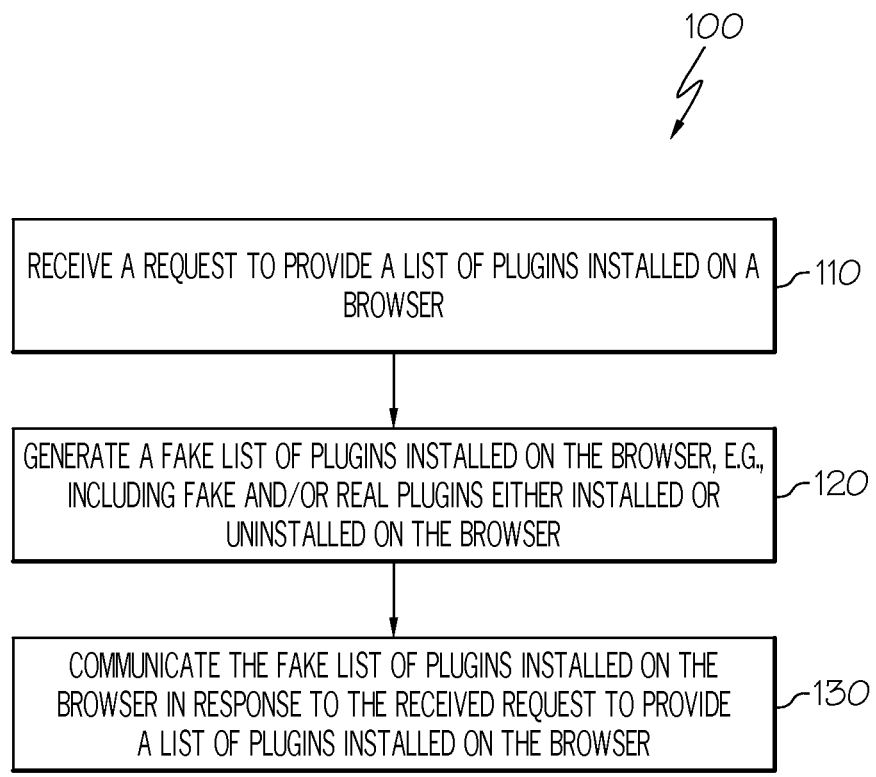
FIG. 1 is a flowchart of an example of a method 100 for reducing the value of a browser fingerprint.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of an example of a method 100 for reducing the value of a browser fingerprint. In block 110, a processing device receives a request to provide a list of plugins installed on a browser. The request may be in response to the browser navigating to a web server hosting a website. The web server, in typical applications, can request a list of plugins installed on the browser visiting the website in order to determine the functionality of the browser, and therefore, determine what functionality the web server can send the browser. For example, in one instance, a plugin is installed at the browser and configured for running a particular type of script for displaying complex graphics to the user. In such a case, the web server may be informed of the installation of the plugin on the browser and may, during communication of the source code for presenting the website on the browser, include the script for displaying the complex graphics knowing the browser, in conjunction with the installed plugin, will be able to run the script effectively.

In block 120, once the processing device has received the request, the processing device generates a fake list of plugins installed on the browser.

In block 130, after generating the fake list of plugins installed on the browser, the processing device communicates, or instructs a communication device, to communicate the fake list of plugins installed on the browser in response to the received request to provide a list of plugins installed on the browser.

For example, in some embodiments, the fake list of plugins includes one or more fake plugins. Fake plugins include at least two types of plugins. The first type of fake plugins are actual plugins that do not perform a typical plugin function, and are therefore referred to as "shell" plugins. The second type of fake plugins are not actual plugins, but rather, are merely program code, variables, identification information or other data indicating the presence of an actual plugin to an entity, such as a web server, processing device, browser or the like, viewing the list of plugins when no actual plugin exists. Such fake plugins are referred to as "phantom" plugins.

In some embodiments, the fake list of plugins includes one or more real plugins. Real plugins are plugins configured to perform a typical function of a plugin and are not fake plugins, such as shell or phantom plugins. The real plugins included in the fake list of plugins may include real plugins actually installed on the browser and may include real plugins not installed, that is, uninstalled on the browser. As used herein "uninstalled" refers to both plugins that were previously installed on the browser and subsequently uninstalled, as well as plugins that have never been installed on the browser. For example, the fake list of plugins, in some such embodiments, includes some or all of the list of actual plugins installed on the browser. For example, in one embodiment, the fake list of plugins includes a list of all the plugins actually installed on the browser. As another example, in another embodiment, the fake list of plugins includes only a partial list of the plugins actually installed on the browser. Such an embodiment may be used in a situation, for example, where the browser is aware of the type of website that should be requesting a list of plugins, and recognizes that certain plugins actually installed on the browser should not be needed at the particular website. In other instances, the browser may not be expecting a request for a list of plugins, because the browser has not, for example, been directed to a new website. In such a case, it may be beneficial for the browser not to provide a full list of the plugins actually installed on the browser as an additional measure to protect privacy. In some embodiments, and in similar situations, the browser may be configured not to provide any of the plugins actually installed on the browser in response to the request for the list of plugins.

In yet other embodiments, for example, the various plugins actually installed on the browser are classified and/or characterized with regard to their breadth of usefulness across the Internet. For example, plugins used on most or all websites are classified as plugins less likely to provide a privacy security risk. This, of course, is because, when such a plugin is combined with the various other plugins installed on the browser, that particular plugin is much less likely to render a browser's fingerprint unique. In fact, in some cases, removal of such a common plugin from the list of plugins can actually increase the likelihood of rendering the browser's fingerprint unique, because most other browsers include the common plugin. Hence, in some embodiments, common plugins are classified as such and are not removed from the fake list, whereas, less common plugins are removed from the fake list.

In some embodiments, the fake list includes fake or real, installed or uninstalled, plugins generated by a third party entity, such as a processing device, server, website, browser, service or the like. In some such embodiments, the processing device requests and receives a third party fake list of plugins after receiving a request to provide the list of plugins. In other such embodiments, the processing device requests and receives a third party fake list periodically or at predetermined times, thereby having a fake list of plugins available and stored proximally the processing device, for example, at a memory device collocated with the processing device. In some such embodiments, for example, the processing device, after having communicated a list of plugins, requests a new fake list of plugins from the third party entity. In some such embodiments, the third party entity is a plugin itself installed on the browser and configured for generating the fake list of plugins in response to a request to provide a list of plugins installed on the browser.

In some embodiments, the processing device, after having communicated a list of plugins recognizes a need for a new fake list of plugins and performs step 120 to generate a new fake list of plugins installed on the browser. In this regard, step 120, in some embodiments, is performed before step 110, that is, before receiving a request for a list of plugins.

Figure 2:
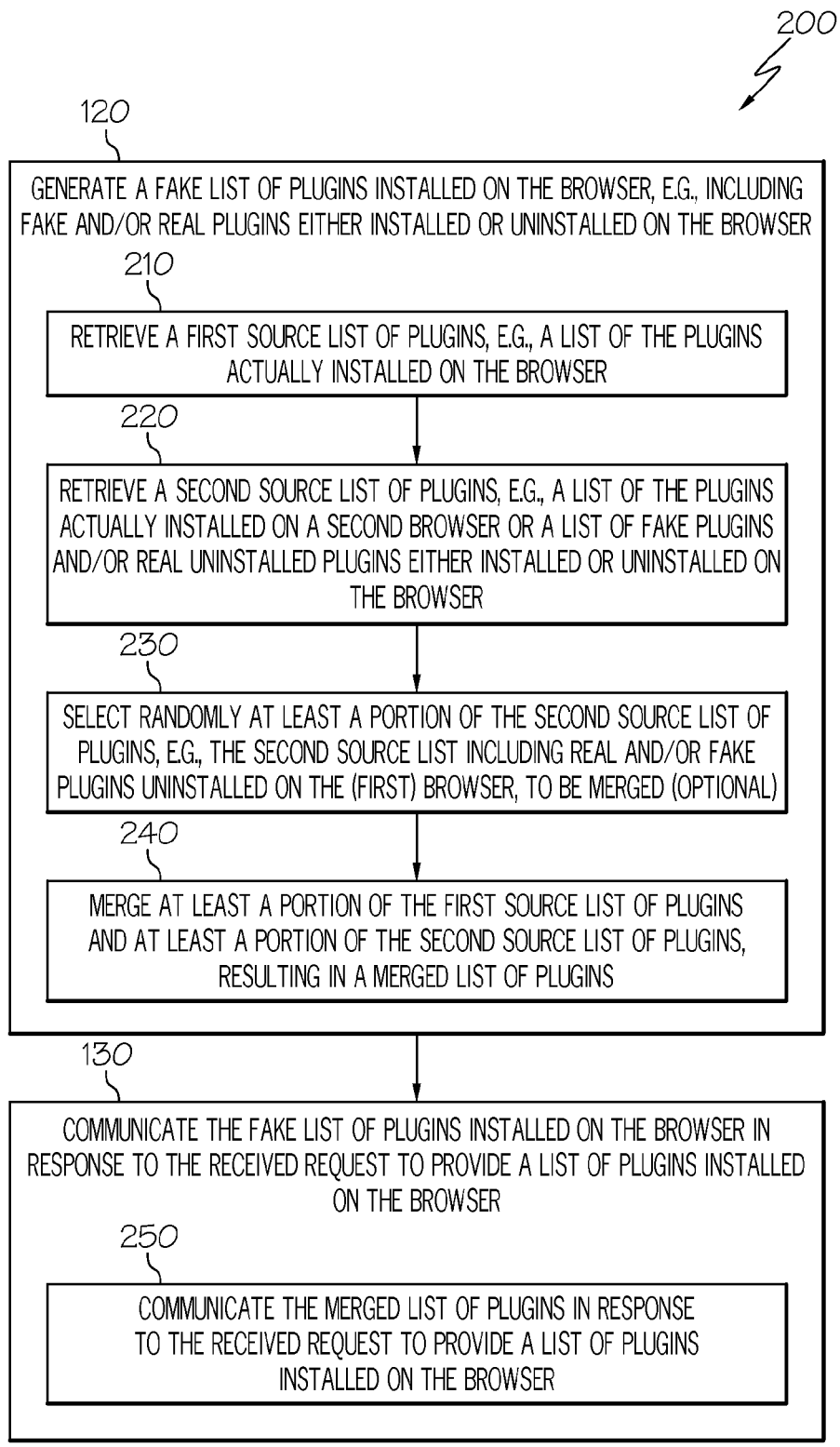
FIG. 2 is a flowchart of an example of a method 200 for reducing the value of a browser fingerprint in accordance with another embodiment of the present invention.

FIG. 2 is a flowchart of an example of a method 200 for reducing the value of a browser fingerprint in accordance with another embodiment of the present invention. In block 120, originally presented in FIG. 1, the processing device generates a fake list of plugins installed on the browser. In various embodiments, block 120 includes one or more other blocks, such as blocks 210, 220, 230, and 240 as shown in the example of FIG. 2.

In block 210, the processing device retrieves a first source list of plugins. For example, in some embodiments, the first source list of plugins is a list of the plugins actually installed on the browser. In another example, the first source list of plugins is a fake list of plugins generated by the processing device and/or generated by a third party entity as discussed above. The fake list of plugins, as discussed above, may be a combination of fake, real, installed, and uninstalled plugins.

In block 220, the processing device retrieves a second source list of plugins. For example, in some embodiments, the second source list of plugins is a list of the plugins actually installed on a second browser different than the (first) browser. In other embodiments, the second source list is a list of fake plugins and/or real uninstalled plugins either installed or uninstalled on the (first) browser.

In one embodiment, for example, the first source list of plugins includes a list of the plugins actually installed on the browser, and the second source list of plugins includes a list of the plugins actually installed on the second browser. In another embodiment, for example, the first source list of plugins includes a list of the plugins actually installed on the browser, and the second source list of plugins includes a list of fake plugins as discussed above.

In block 230, the processing device randomly selects at least a portion of the second source list of plugins to be merged (in step 240 discussed below), which is an optional step in the method 200. For example, in one embodiment, the second source list includes real and/or fake plugins uninstalled on the (first) browser. In such embodiments, there may be a pool of potential plugins (real and/or fake) from which the processing device populates the second source list. In some embodiments, such population is performed randomly.

In block 240, the processing device merges at least a portion of the first source list of plugins and at least a portion of the second source list of plugins, thereby resulting in or creating a merged list of plugins. For example, in one embodiment, the first source list of plugins is a list of the plugins actually installed on the browser, and the second source list of plugins is a list of the plugins installed on a second browser. The processing device, in this example, merges the first and second source lists by combining them.

In block 130, originally presented in FIG. 1, the processing device communicates or instructs a communication device to communicate the fake list of plugins installed on the browser in response to the received request to provide a list of plugins installed on the browser. In some embodiments, such as the embodiment illustrated in FIG. 2, block 130 includes one or more other blocks, such as block 250. In block 250, the processing device communicates, or instructs a communication device to communicate, the merged list of plugins in response to the received request to provide a list of plugins installed on the browser.

In some embodiments, a module, application or plugin is installed at the processing device (referred to as a "social net module"), computer system or on the browser configured to enable upload of a browser fingerprint to a social net, for example, a database, datastore or other memory available over the Internet, configured for storing two or more browsers' fingerprint information. In some such embodiments, the social net module is also configured to scan browser fingerprints stored at the social net and use one or more of the browser fingerprints as the second source list of block 220 of FIG. 2. In some embodiments, the social net module is also configured to scan the browser fingerprints stored at the social net and use one or more as the fake list of plugins installed on the browser of block 120 of FIG. 1. In some such embodiments, the processing device, running the social net module, generates the fake list of plugins installed on the browser by performing a union of the two or more sets of plugins retrieved from the two or more browser fingerprints of the social net. In some such embodiments, the plugins of the other browsers are actually installed on the user's browser. Thus, in some embodiments, the browser's fingerprint or list of plugins becomes identical with the list of plugins of at least one other browser. Accordingly, the browser's fingerprint, does not absolutely identify the browser uniquely, but rather, at least one other browser has an identical fingerprint. In some embodiments, multiple browser fingerprints are loaded at the social net and combined to form each browser's fingerprint through the social net and each browser's respective social net module, and therefore, potentially many browsers associated with the social net would return a browser fingerprint identical to the browser fingerprint of many other browser in response to a request.

Figure 3:
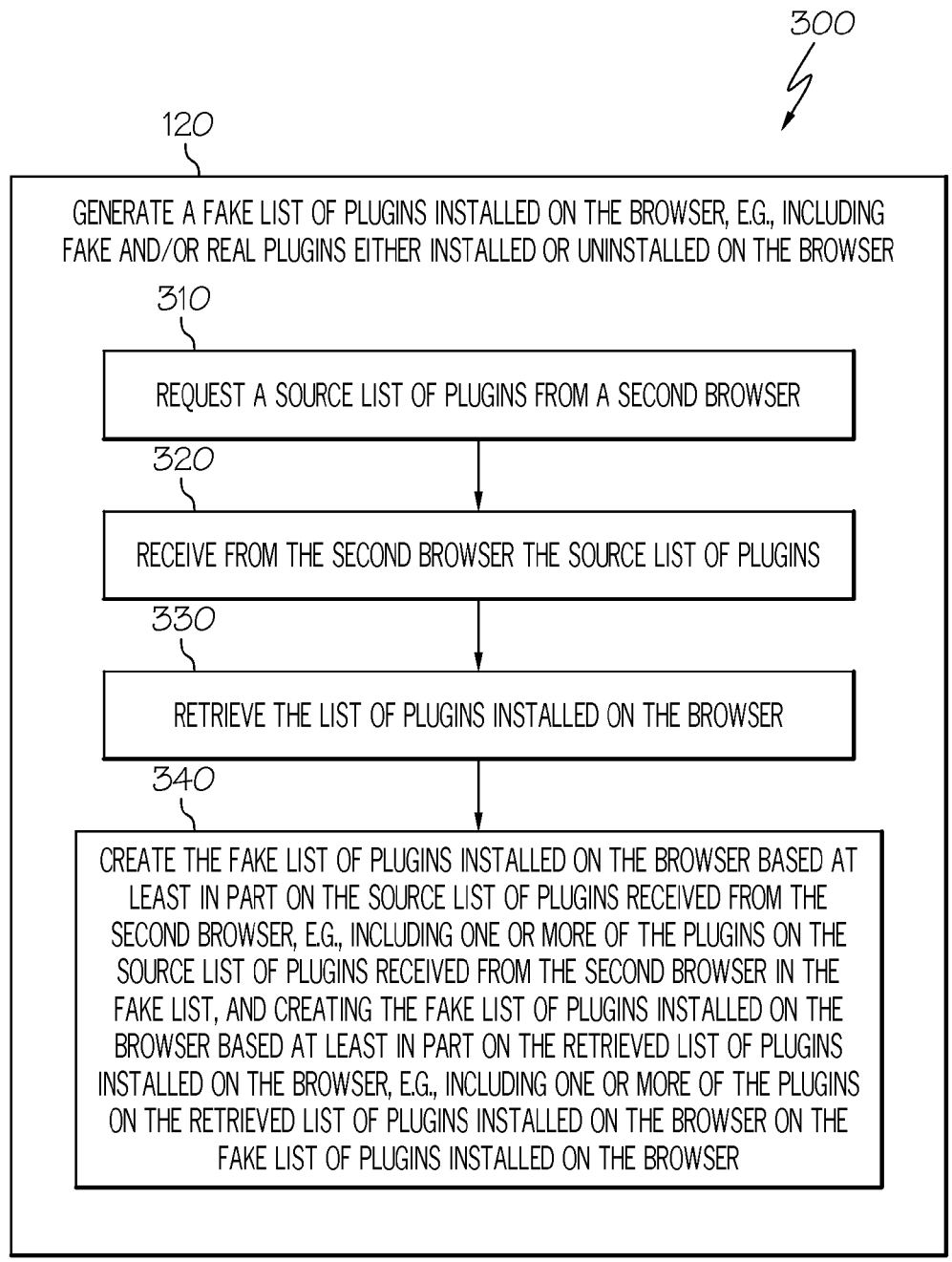
FIG. 3 is a flowchart of an example of a method 300 for reducing the value of a browser fingerprint in accordance with another embodiment of the present invention.

FIG. 3 is a flowchart of an example of a method 300 for reducing the value of a browser fingerprint in accordance with another embodiment of the present invention. In block 120, originally presented in FIG. 1, the processing device generates a fake list of plugins installed on the browser. In various embodiments, block 120 includes one or more other blocks, such as blocks 310, 320, 330, and 340 as shown in the example of FIG. 3.

In block 310, the processing device requests a source list of plugins from a second browser. In block 320, the processing device receives, from the second browser, the source list of plugins. In block 330, the processing device retrieves the list of plugins installed on the (first) browser. In block 340, the processing device creates the fake list of plugins installed on the browser based at least in part on the source list of plugins received from the second browser and based at least in part on the retrieved list of plugins installed on the (first) browser. For example, in one embodiment, the processing device includes one or more of the plugins on the source list of plugins received from the second browser in the fake list. As another example, in another embodiment, the processing device includes one or more of the plugins on the retrieved list of plugins installed on the browser in the fake list.

FIG. 4 is a block schematic diagram of an example of a system 400 for reducing the value of a browser fingerprint in accordance with an embodiment of the present invention. The methods 100, 200, and 300 of FIGS. 1, 2, and 3, respectively, may be embodied in or performed by the system 400. The system 400 may include a processing device 402. The processing device 402 may be a computer system, or similar processing device. A module 404 for reducing the value of a browser fingerprint may be stored on the processing device 402 and may be operable on the processing device 402 for reducing the value of a browser fingerprint similar to that described herein. The module 404 may be stored on a file system 406 of the processing device 402. Portions of or all of the methods 100, 200 and 300 may be embodied in or performed by the module 404.

The module 404 for reducing the value of a browser fingerprint may include a module for retrieving source lists of plugins 408. The module for retrieving source lists of plugins 408 may perform operations similar to those described with reference to blocks 210 and 220 in FIG. 2 and block 330 in FIG. 3, among other operations.

The module 404 for reducing the value of a browser fingerprint may also include a module for generating a fake list of plugins 410. The module for generating a fake list of plugins 410 may perform operations similar to those described with reference to block 120 in FIGS. 1, 2 and 3 and block 230 in FIG. 2, among other operations.

The module 404 for reducing the value of a browser fingerprint may also include a module for communicating the fake list of plugins 412. The module for communicating the fake list of plugins 412 may perform operations similar to those described with reference to block 130 in FIGS. 1 and 2 and block 250 in FIG. 2, among other operations.

The module 404 for reducing the value of a browser fingerprint may also include a module for merging the source lists of plugins 414. The module for merging the source list of plugins 414 may perform operations similar to those described with reference to block 240 in FIG. 2 and block 340 in FIG. 3, among other operations.

The module 404 for reducing the value of a browser fingerprint may also include a social net module 416. The social net module 416 may perform operations similar to those described with reference to block 120 in FIGS. 1 and 2 and blocks 220 and 240 in FIG. 2, among other operations.

A user 418 of the system 400, may use the processing device, which is, for example, a computer system, to access module 404 for reducing the value of a browser fingerprint. The processing device 402 may include a processor 422 to control operation of the processing device 402 and the file system 406, such as, for example a memory device. An operating system 426, applications 428 and other programs, such as a browser 430 having one or more plugins 432 installed on the browser may be stored on the file system 406 for running or operating on the processor 422. The browser 430, such as a web or Internet browser, may be configured for accessing the processing device 402 directly or server 434, for example, a web server, via a network 436 for accessing websites, and retrieving lists of plugins, communicating lists of plugins and other operations discussed herein, controlling operation of modules 404, 408, 410, 412, 414, and 416, or for other purposes related to reducing the value of a browser fingerprint. The network 436 may be the Internet, an intranet or other private or proprietary network.

The processing device 402 may also include a display 438, a speaker system 440, and one or more input devices, output devices or combination input/output devices, collectively I/O devices 442. The I/O devices 442 may include a keyboard, pointing device, such as a mouse, disk drives and any other devices to permit a user, such as user 418, to interface with and control operation of the processing device 402 and to access the module 404 or system for reducing the value of a browser fingerprint. The processing device 402 may also include a communication device 444 configured to receive instructions from the processor 422 and configured to communicate across the network 436 with the server 434 autonomously or in conjunction with the browser 430 and the module for retrieving the source lists of plugins 408, the module for communicating the fake list of plugins 412, and the social net module 416.

The processing device 402 may also communicate over the network 436 with one or more social nets 448, which, as discussed above, is or includes one or more databases or datastores and is configured to communicate with one or more other processing devices, such as processing devices 450A and 450B. In some embodiments, the social net 448 communicates via network 436 with the one or more processing devices. As discussed above, the social net is configured to receive and store one or more browser fingerprints from the one or more processing devices, such as 450A and/or 450B. Then, when requested by a social net module, such as 416, the social net communicates one or more lists of plugins to the processing device 402. For example, the social net module scans the stored browser fingerprints for fingerprints similar to the browser 430's fingerprint and then requests one or more lists of plugins corresponding with those one or more similar fingerprints. Then, the social net module 416 is configured to merge, for example, by creating a union of, the lists of plugins. This merged list may be returned in the event of a request for a list of plugins.

In accordance with embodiments of the present invention, a method, operable on a processing device, reduces the value of a browser fingerprint and may include receiving, by the processing device, a request to provide a list of plugins installed on a browser. The method may also include generating, by the processing device, a fake list of plugins installed on the browser. The method may additionally include communicating, by the processing device, the fake list of plugins installed on the browser in response to the received request to provide a list of plugins installed on the browser.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method, operable on a processing device, for reducing the value of a browser fingerprint, comprising:
    receiving, by the processing device, a request to provide a list of plugins installed on a browser;
    generating, by the processing device, a fake list of plugins installed on the browser, wherein the fake list of plugins comprises at least one fake plugin, the at least one fake plugin comprising at least one of a shell plugin and a phantom plugin; and
    communicating, by the processing device, the fake list of plugins installed on the browser in response to the received request to provide a list of plugins installed on the browser.

2. The method of claim 1, wherein the fake list of plugins comprises uninstalled plugins.

3. The method of claim 1, wherein generating a fake list of plugins installed on the browser comprises:
    retrieving, by the processing device, a first source list of plugins;
    retrieving, by the processing device, a second source list of plugins; and
    merging, by the processing device, at least a portion of the first source list of plugins and
    at least a portion of the second source list of plugins, resulting in a merged list of plugins; and
    wherein the fake list of plugins installed on the browser comprises the merged list of plugins.

4. The method of claim 1, wherein generating a fake list of plugins installed on the browser comprises:
    retrieving, by the processing device, a first list of plugins installed on the browser;
    retrieving, by the processing device, a second list of plugins uninstalled on the browser;
    merging, by the processing device, at least a portion of the first list of plugins installed on the browser and at least a portion of the second list of plugins uninstalled on the browser, resulting in a merged list of plugins; and
    wherein the fake list of plugins installed on the browser comprises the merged list of plugins.

5. The method of claim 4, wherein generating a fake list of plugins installed on the browser further comprises:
    selecting randomly, by the processing device, the at least a portion of the second list of plugins uninstalled on the browser.

6. The method of claim 1, wherein generating a fake list of plugins installed on the browser comprises:
    requesting, by the processing device, a source list of plugins from a second browser;
    receiving, by the processing device, from the second browser, the source list of plugins; and
    creating, by the processing device, the fake list of plugins installed on the browser based at least in part on the source list of plugins received from the second browser.

7. The method of claim 6, wherein generating a fake list of plugins installed on the browser further comprises:
    retrieving, by the processing device, the list of plugins installed on the browser; and
    creating, by the processing device, the fake list of plugins installed on the browser based at least in part on the list of plugins installed on the browser and based at least in part on the source list of plugins received from the second browser.

8. A processing device for reducing the value of a browser fingerprint, the processing device comprising:
    a processor, the processor configured to receive a request to provide a list of plugins installed on a browser;
    a module operable on the processor for reducing the value of the browser fingerprint, the module comprising:
    a module for generating a fake list of plugins installed on the browser, wherein the fake list of plugins comprises at least one fake plugin, the at least one fake plugin comprising at least one of a shell plugin and a phantom plugin; and a module for communicating the fake list of plugins installed on the browser in response to the received request to provide a list of plugins installed on the browser.

9. The processing device of claim 8, wherein the module for generating a fake list of plugins installed on the browser comprises:
a module for retrieving a first source list of plugins;
a module for retrieving a second source list of plugins; and
a module for merging at least a portion of the first source list of plugins and at least a portion of the second source list of plugins, resulting in a merged list of plugins; and
wherein the fake list of plugins installed on the browser comprises the merged list of plugins.

10. The method of claim 8, wherein the module for generating a fake list of plugins installed on the browser comprises:
a module for retrieving a first list of plugins installed on the browser;
a module for retrieving a second list of plugins uninstalled on the browser;
a module for merging at least a portion of the first list of plugins installed on the browser and at least a portion of the second list of plugins uninstalled on the browser, resulting in a merged list of plugins; and
wherein the fake list of plugins installed on the browser comprises the merged list of plugins.

11. The processing device of claim method of claim 10, wherein the module for generating a fake list of plugins installed on the browser further comprises:
a module for selecting randomly the portion of the second list of plugins uninstalled on the browser.

12. The processing device of claim 8, wherein the module for generating a fake list of plugins installed on the browser comprises:
a module for requesting a source list of plugins from a second browser;
a module for receiving from the second browser, the source list of plugins; and
a module for creating the fake list of plugins installed on the browser based at least in part on the source list of plugins received from the second browser.

13. The processing device of claim 12, wherein the module for generating a fake list of plugins installed on the browser further comprises:
a module for retrieving the list of plugins installed on the browser; and
a module for creating the fake list of plugins installed on the browser based at least in part on the list of plugins installed on the browser and based at least in part on the source list of plugins received from the second browser.

14. A computer program product for reducing the value of a browser fingerprint, the computer program product comprising:
a computer readable storage medium having computer readable program code embodied therewith, the computer readable program code comprising:
computer readable program code configured to receive a request to provide a list of plugins installed on a browser;
computer readable program code configured to generate a fake list of plugins installed on the browser, wherein the fake list of plugins comprises at least one fake plugin, the at least one fake plugin comprising at least one of a shell plugin and a phantom plugin; and
computer readable program code configured to communicate the fake list of plugins installed on the browser in response to the received request to provide a list of plugins installed on the browser.

15. The computer program product of claim 14, wherein the computer readable program code configured to generate a fake list of plugins installed on the browser comprises:
computer readable program code configured to retrieve a first source list of plugins;
computer readable program code configured to retrieve a second source list of plugins; and
computer readable program code configured to merge at least a portion of the first source list of plugins and at least a portion of the second source list of plugins, resulting in a merged list of plugins; and
wherein the fake list of plugins installed on the browser comprises the merged list of plugins.

16. The computer program product of claim 14, wherein the computer readable program code configured to generate a fake list of plugins installed on the browser comprises:
computer readable program code configured to retrieve a first list of plugins installed on the browser;
computer readable program code configured to retrieve a second list of plugins uninstalled on the browser;
computer readable program code configured to merge at least a portion of the first list of plugins installed on the browser and at least a portion of the second list of plugins uninstalled on the browser, resulting in a merged list of plugins; and
wherein the fake list of plugins installed on the browser comprises the merged list of plugins.

17. The computer program product of claim 16, wherein the computer readable program code configured to generate a fake list of plugins installed on the browser further comprises:
computer readable program code configured to select randomly the at least a portion of the second list of plugins uninstalled on the browser.

18. The computer program product of claim 14, wherein the computer readable program code configured to generate a fake list of plugins installed on the browser comprises:
computer readable program code configured to request a source list of plugins from a second browser;
computer readable program code configured to receive from the second browser, the source list of plugins; and
computer readable program code configured to create the fake list of plugins installed on the browser based at least in part on the source list of plugins received from the second browser.

19. The computer program product of claim 18, wherein the computer readable program code configured to generate a fake list of plugins installed on the browser further comprises:
computer readable program code configured to retrieve the list of plugins installed on the browser; and
computer readable program code configured to create the fake list of plugins installed on the browser based at least in part on the list of plugins installed on the browser and based at least in part on the source list of plugins received from the second browser.

20. The method of claim 1, wherein the shell plugin comprises a plugin that does not perform a function.

21. The method of claim 1, wherein the phantom plugin comprises data indicating a presence of an actual plugin on the browser to an entity viewing the list of plugins installed on the browser when the actual plugin does not exist.

* * * * *